United States Patent

Derra et al.

[11] Patent Number: 5,608,294
[45] Date of Patent: Mar. 4, 1997

[54] HIGH PRESSURE LAMP OPERATING CIRCUIT WITH SUPPRESSION OF LAMP FLICKER

[75] Inventors: Gunther H. Derra, Aachen; Hanns E. Fischer; Hans G. Ganser, both of Stolberg, all of Germany; Holger Monch, Vaals, Netherlands

[73] Assignee: U.S. Philips Corporation, New York, N.Y.

[21] Appl. No.: 471,297

[22] Filed: Jun. 7, 1995

[30] Foreign Application Priority Data

Jun. 22, 1994 [EP] European Pat. Off. .............. 94201784

[51] Int. Cl.⁶ .................................................. H05B 37/02
[52] U.S. Cl. .................... 315/224; 315/209 R; 315/105; 315/307; 315/DIG. 7
[58] Field of Search ............................... 315/209 R, 107, 315/224, 244, 247, 283, 289, 307, DIG. 5, DIG. 7, 105

[56] References Cited

U.S. PATENT DOCUMENTS

| | | | |
|---|---|---|---|
| 4,471,269 | 9/1984 | Ganser et al. | 315/307 |
| 4,485,434 | 11/1984 | Beeston et al. | 363/132 |
| 4,700,113 | 10/1987 | Stupp et al. | 315/224 |
| 4,870,327 | 9/1989 | Jorgensen | 315/307 |
| 5,059,869 | 10/1991 | Albach et al. | 315/289 |
| 5,068,578 | 11/1991 | Wegener | 315/307 |
| 5,070,276 | 12/1991 | Burgholte et al. | 315/209 |
| 5,130,605 | 7/1992 | Ogawa et al. | 315/105 |
| 5,357,173 | 10/1994 | Kachmarick et al. | 315/209 R |

FOREIGN PATENT DOCUMENTS 0389847  10/1990  European Pat. Off. .

Primary Examiner—Robert Pascal
Assistant Examiner—Haissa Philogene
Attorney, Agent, or Firm—Edward Blocker; Bernard Franzblau

[57] ABSTRACT

A circuit arrangement for operating a high pressure discharge lamp includes input terminals for connection to a supply voltage source and an apparatus coupled to the input terminals for supplying an alternating lamp current to the high pressure discharge lamp. A device (III) is provided for generating a current pulse in each half period of the lamp current. This current pulse has the same polarity as the lamp current and is superimposed on the lamp current in the latter part of a predetermined fraction of the half periods of the lamp current. The circuit substantially suppresses flickering of the discharge arc during lamp operation.

23 Claims, 2 Drawing Sheets

HIGH PRESSURE LAMP OPERATING CIRCUIT WITH SUPPRESSION OF LAMP FLICKER

BACKGROUND OF THE INVENTION

This invention relates to a method for operating a high pressure discharge lamp wherein an alternating lamp current is supplied to the high pressure discharge lamp.

The invention also relates to a circuit arrangement for operating a high pressure discharge lamp comprising input terminals (K1, K2) for connection to a supply voltage source, means, coupled to the input terminals, for supplying an alternating lamp current to the high pressure discharge lamp.

Such a method and such a circuit arrangement are known from the U.S. Pat. No. 4,485,434. It has been found that AC operation of high pressure discharge lamps with a low frequency alternating lamp current prevents a rapid erosion of the electrodes of the high pressure discharge lamp (further also referred to as the lamp) and allows operation of the lamp with a relatively high efficacy.

A problem associated with the operation of this type of lamp is that depending on the temperature of the electrode and the condition of the surface of the electrode, the discharge arc in the direct vicinity of the electrode is often not stable because the origin of the discharge arc jumps from one spot on the surface of the electrode to the next. If the surface of the electrode is too cold, the discharge arc is very thin in the immediate vicinity of the electrodes and therefore causes overheating of its origin on the surface of the electrode thereby creating micropikes. During operation the origin of the discharge arc jumps between these micropikes, causing a flickering of the high pressure discharge lamp. Flickering can also be caused by too high an electrode temperature. Under such conditions the perpetual displacement and evaporation of electrode material are the cause of instabilities in the discharge arc. In the case where a high pressure discharge lamp is operated with an AC current, each electrode of the lamp alternatingly functions as a cathode and as an anode during successive half periods of the lamp current. During these half periods the electrode is said to be in the cathodic phase and the anodic phase respectively. Electrode material, that is removed from the electrode in the anodic phase, returns to the electrode as a stream of ions in the cathodic phase. These transport processes further complicate the behaviour of the electrode temperature during a period of the lamp current since the time dependency of the electrode temperature in the anodic phase differs from that in the cathodic phase. Because of this, the electrode temperature varies strongly over a period of the lamp current and the discharge arc originates from different places on the surface of the electrode during the anodic phase. In the cathodic phase, however, the origin of the discharge arc on the surface of the same electrode will be located arbitrarily in only one of these different places. This behaviour is particularly unacceptable when the high pressure discharge lamp is used in an optical application such as projection television. In such an application the distance between the electrodes needs to be very short since the discharge arc should approach a point light source. Because of the short distance between the electrodes, however, the fact that the discharge arc can originate from a different place on the electrode during every other cathodic phase causes instabilities through the whole discharge arc and therefore a very strong flickering.

SUMMARY OF THE INVENTION

The invention aims to provide a method for operating a high pressure discharge lamp and a circuit arrangement for operation of a high pressure discharge lamp in such a way that flickering of the lamp during operation is substantially suppressed.

According to the invention, a method of the kind mentioned in the opening paragraph is for this purpose characterized in that a current pulse is generated in a predetermined fraction of the half periods of the lamp current, said current pulse having the same polarity as the lamp current and being superimposed on the lamp current in the latter part of the half period in which it is generated. Also according to the invention, a circuit arrangement of the kind mentioned in the second paragraph is for this purpose characterized in that the circuit arrangement further comprises means III for generating a current pulse in a predetermined fraction of the half periods of the lamp current, said current pulse having the same polarity as the lamp current and being superimposed on the lamp current in the latter part of the half period in which it is generated.

Because the total amount of current flowing through the lamp is increased at the end of a predetermined fraction of the half periods of the lamp current by means of the current pulse, the temperature of the electrode is raised to a relatively high value. This high temperature increases the stability of the discharge arc, because the discharge arc originates from the same place on the electrode in each cathodic phase. It has been found that when operating a high pressure discharge lamp, flickering can be substantially suppressed when a method and/or a circuit arrangement according to the invention is used.

In addition it was found that in case the high pressure discharge lamp is a metal halide lamp the increased ion current caused by the current pulses leads to an increased deposition of metals present in the lamp plasma on to the surface of the electrodes, whereby the work function of the electrodes is lowered.

The current pulses can be generated periodically (e.g. in every third or every fifth half period of the lamp current) or in bursts (e.g. during 5 successive half periods a current pulse is generated, in the next 5 succesive half periods no current pulse is generated, then in the next 5 successive half periods a current pulse is generated etc.).

Very good results have been obtained when a current pulse is generated in each half period of the lamp current.

It has also been found that when the current pulse has a higher amplitude, it can be of a shorter duration in order to achieve the same results in terms of suppression of flickering. The optimum amplitude and duration of the current pulse depend on the type of lamp and the dimensions of the electrodes. Good results were obtained when the frequency of the lamp current was selected from the range 50 Hz–500 Hz, the ratio between the mean amplitude of the current pulse and the mean amplitude of the lamp current was chosen between 0.6 and 2 and the ratio between the duration of the current pulse and half a period of the lamp current was between 0.05 and 0.15. The mean amplitude of the lamp current is the average value of Me amplitude of the lamp current in half a period. The mean amplitude of the current pulse is the average value of Me amplitude of the current pulse in the duration of the current pulse. Preferably, the amount of energy supplied to the high pressure discharge lamp by means of the current pulse is between 5% and 15% of the amount of energy supplied to the high pressure discharge lamp by the lamp current during one half period.

A circuit arrangement according to the invention can be manufactured in a relatively simple and inexpensive way in the case where the means for supplying an alternating lamp current to the high pressure discharge lamp comprise means I coupled to said input terminals for generating a DC supply current from a supply voltage supplied by the supply voltage source, and a commutator II for converting the DC supply current into an alternating lamp current. Preferably the means I for generating a DC supply current comprise a DC-DC-converter equipped with a switching element that is operated at a high frequency during lamp operation and the means for generating a current pulse comprise means for adjusting the duty cycle or the switching frequency of this switching element. In this way the current pulse is generated using means that are also used to generate the alternating lamp current.

In an advantageous embodiment of a circuit arrangement according to the invention, the circuit arrangement comprises a power control loop equipped with means for generating a signal that is a measure for a desired amount of power consumed by the high pressure discharge lamp and the means for generating a current pulse comprise means for adjusting said signal.

In another advantageous embodiment the commutator comprises a full bridge circuit.

BRIEF DESCRIPTION OF THE DRAWINGS

An embodiment of the invention will be further explained with reference to the accompanying drawing.

In the drawing.

DESCRIPTION OF THE PREFERRED EMBODIMENTS

Figure 1:
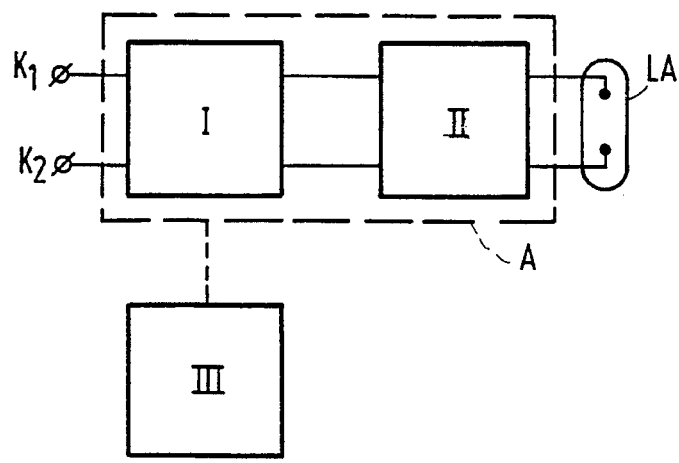
FIG. 1 shows an embodiment of a circuit arrangement according to the invention.

In FIG. 1, K1 and K2 denote input terminals for connection to a supply voltage source supplying a supply voltage. I, coupled to K1 and K2, are means for generating a DC supply current. Output terminals of means I are connected to respective input terminals of commutator II. Output terminals of commutator II are connected to the high pressure discharge lamp La. Means I and means II together constitute means A for supplying an alternating lamp current to the high pressure discharge lamp. III are means for generating a current pulse in each half period of the lamp current. For this purpose means III are coupled to means A as indicated in FIG. 1 by means of a dotted line.

The operation of the circuit arrangement shown in FIG. 1 is as follows.

When input terminals K1 and K2 are connected to poles of a voltage supply source, means I generate a DC supply current from the supply voltage supplied by the voltage supply source. Commutator II converts this DC supply current into an alternating lamp current. In each half period of the lamp current, means III generate a current pulse having the same polarity as the lamp current which is superimposed on the lamp current in the latter part of each half period. Both the lamp current and the current pulses superimposed on the lamp current are supplied to the lamp La.

Figure 2:
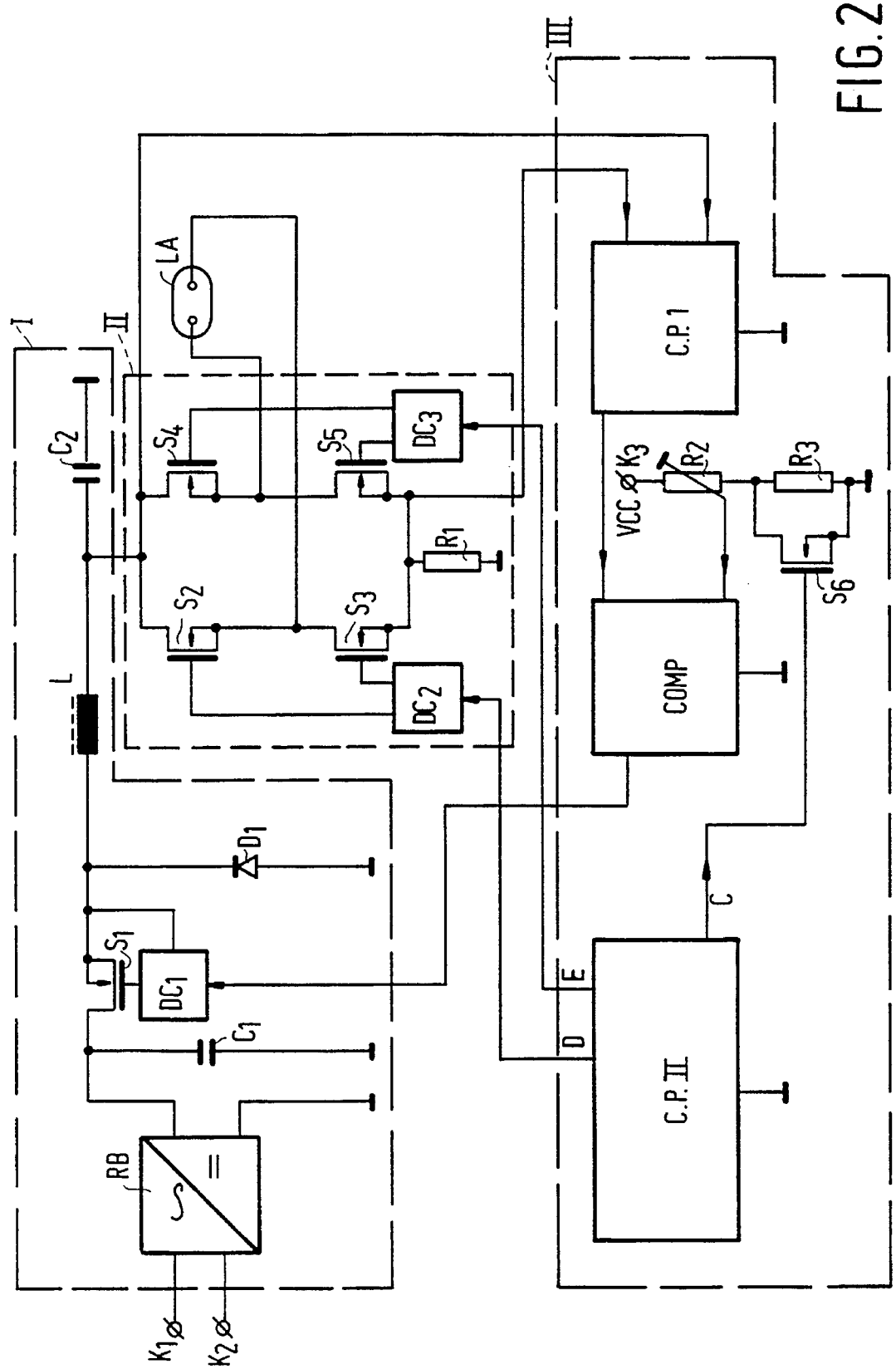
FIG. 2 shows an embodiment of a circuit arrangement according to the invention in accordance with FIG. 1.

In FIG. 2, the means I for generating a DC supply current are formed by rectifier bridge RB, capacitors C1 and C2, driver circuit DC1, switching element S1, diode D1 and inductive element L. Commutator II consists in this embodiment of switching elements S2, S3, S4 and S5 together with driver circuits DC2 and DC3 and the resistor R1. Means III are formed by circuit parts CPI and CPII, comparator COMP, switching element S6, terminal K3, potentiometer R2, resistor R3 and additional circuitry for generating a substantially constant voltage at terminal K3 during lamp operation. This additional circuitry is not shown in the figure.

K1 and K2 denote input terminals for connection to a supply voltage source supplying a low-frequency AC supply voltage. K1 and K2 are connected to respective input terminals of rectifier bridge RB. A first output terminal of rectifier bridge RB is connected to a first side of capacitor C1. A further side of capacitor C1 is connected to a second output terminal of rectifier bridge RB. The first side of capacitor C1 is also connected to a first main electrode of switching element S1. A control electrode of switching element S1 is connected to an output terminal of driver circuit DC1. A further main electrode of switching element S1 is connected to a cathode of diode D1 and to an input of driver circuit DC1. An anode of diode D1 is connected to the further side of capacitor C1. The cathode of diode D1 is also connected to a first side of inductive element L. A further side of inductive element L is connected to both a first main electrode of switching element S2 as well as a first main electrode of switching element S4. The further side of inductive element L is also connected to a first side of capacitor C2. A further side of capacitor C2 is connected to the further side of capacitor C1. A further main electrode of switching element S2 is connected to a first main electrode of switching element S3 and a further main electrode of switching element S4 is connected to a first main electrode of switching element S5. A further main electrode of switching element S3 and a further main electrode of switching element S5 are connected to a first side of resistor R1 and a further side of resistor R1 is connected to the further side of capacitor C1. The further main electrodes of switching element S2 and switching element S4 are connected (during operating conditions) to a high pressure discharge lamp La. A control electrode of switching element S2 and a control electrode of switching element S3 are connected to respective output terminals of a driver circuit DC2. A control electrode of switching element S4 and a control electrode of switching element S5 are connected to respective output terminals of a driver circuit DC3. The first side of resistor R1 and the further side of inductive element L are connected to respective input terminals of circuit part CPI. An output terminal of circuit part CPI is connected to a first input terminal of comparator COMP. A further input terminal of comparator COMP is connected to a first side of resistor R3 and a first side of potentiometer R2. A further side of potentiometer R2 is connected to a terminal K3. A further side of resistor R3 is connected to the further side of capacitor C1. Resistor R3 is shunted by switching element S6. An output terminal of comparator COMP is connected to an input terminal of driver circuit DC1. A first output terminal C of circuit part CPII is connected to a control electrode of switching element S6. Two further output terminals D and E of circuit part CPII are connected to respective input terminals of the driver circuits DC2 and DC3.

The operation of the circuit arrangement shown in FIG. 2 is as follows.

When input terminals K1 and K2 are connected to poles of a voltage supply source supplying a low-frequency AC supply voltage, this low frequency AC supply voltage is rectified by the rectifier bridge RB and converted into a DC-voltage present on capacitor C1. Driver circuit DC1, switching element S1, diode D1 and inductive element L together function as a DC-DC-converter, more in particular as a down converter. This down converter converts the DC-voltage present on capacitor C1 into a DC supply current. Capacitor C2 functions as a buffer capacitor. The switching elements S2 and S5 on the one hand and the switching elements S3 and S4 on the other hand are rendered conductive and non-conductive alternatingly by means of the driver circuits DC2 and DC3. As a result the DC supply current is converted into an alternating lamp current. The voltages present at the input terminals of circuit part CPI are a measure for respectively the amplitude of the current flowing through the lamp and the supply voltage of the commutator. Circuit part CPI generates out of these two voltages a signal that is a measure of the power consumed in the lamp. This signal is present at the first input terminal of comparator COMP. During lamp operation a substantially constant voltage is present at terminal K3. This voltage is generated by means that are not shown in FIG. 2. By means of potentiometer R2, resistor R3 and switching element S6 a reference voltage is generated that is present at the second input terminal of comparator COMP and which is a measure for a desired amount of power consumed in the lamp. In dependence on the output signal of comparator COMP, driver circuit DC1 controls the pulse width of the high frequency pulses generated by it. This pulse width in turn controls the amplitude of the current flowing through the lamp. During the first part of each half period of the lamp current switching element S6 is rendered conductive. As a result the reference voltage present at the second input terminal of comparator COMP is relatively low. As a consequence, the pulse width of the high frequency pulses generated by driver circuit DC1, the amplitude of the current flowing through the lamp and therefore the amount of power consumed by the lamp all have a relatively low value. In the latter part of each half period of the lamp current, circuit part CPII renders switching element S6 nonconductive. The reference voltage is thereby increased and as a result, the duty cycle of the driver signal generated by driver circuit DC1 is increased, a current pulse is superimposed on the lamp current and the amount of power consumed by the lamp is increased.

Figure 3:
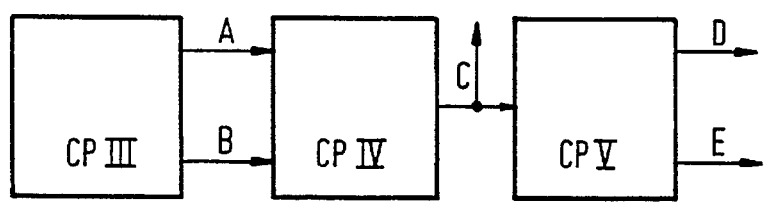
FIG. 3 shows part of the circuit arrangement shown in FIG. 2 in more detail.
Figure 4:
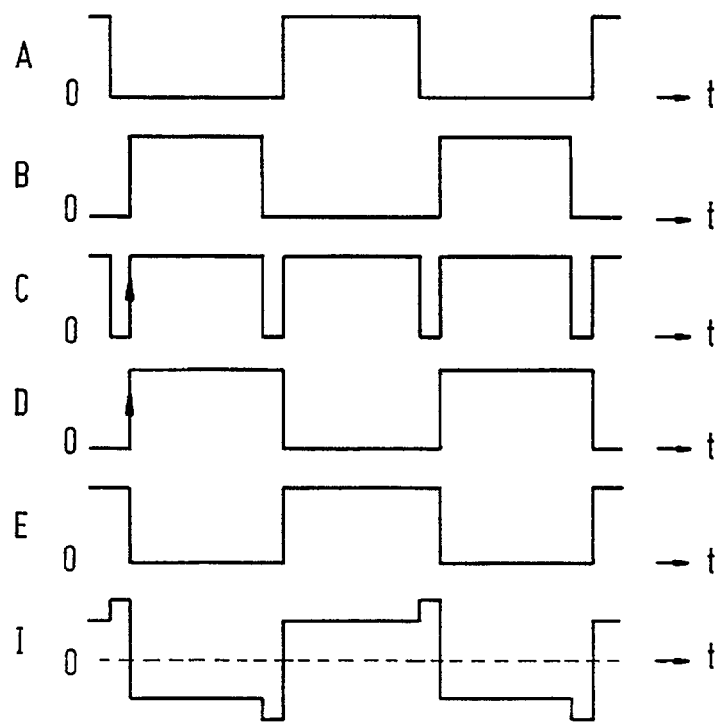
FIG. 4 shows the shapes of currents and voltages present at different terminals of the circuit arrangement shown in FIG. 2 during lamp operation.

FIG. 3 shows that circuit part CPII consists of three circuit parts: CPIII to CPV. CPIII is a digital circuit having a first output terminal A and a second output terminal B. During lamp operation a first digital signal having the same frequency as the lamp current is present at output terminal A. At a second output terminal B of circuit part CPIII a second digital signal also having the frequency of the lamp current is present. The time dependencies of both signals are shown in FIG. 4 by means of the curves marked A and B respectively. It can be seen that the second digital signal can be derived from the first digital signal by inverting the first digital signal and shifting its phase over half a period. Output terminals A and B are connected with respective input terminals of circuit part CPIV. Circuit part CPIV functions as an "or-gate", so that the digital signal present at its output terminal C is "high" when either the first or the second digital signal is "high", while the other signal is "low". In all other situations the digital signal present at output terminal C is "low". The time dependency of the digital signal present at output terminal C is shown in FIG. 4 by means of the curve marked C. Output terminal C is connected to an input terminal of circuit part CPV. Circuit part CPV is a "bistable multivibrator" or a "flipflop". At a first output D of circuit part CPV a digital signal is present that is "high" between successive edges of the digital signal present at output terminal C, during which this latter signal changes from "low" to "high". At a second output E of circuit part CPV a digital signal is present that is "high" and "low", when the digital signal present at output terminal D is "low" and "high" respectively. The time dependencies of the digital signals present at output terminals D and E of circuit part CPV are shown in FIG. 4 by means of curves marked D and E, respectively. Output terminal C is connected to the control electrode of switching element S6 in FIG. 2, so that switching element S6 is conductive when the digital signal at output terminal D is high. The duration of the current pulse is therefore equal to the time interval during which the digital signal at output terminal D is high. The curve marked I in FIG. 4 shows the time dependency of the amplitude of the total amount of current flowing through a high pressure discharge lamp, when such a lamp is operated by means of a circuit arrangement according to the invention. Curve I represents the lamp current as a substantially square wave shaped AC current while the current pulse is also shaped rectangularly. It should be mentioned that these shapes of both lamp current and current pulse are not essential for the present invention. In fact the shape of the current pulse can for instance be sinusoidal, triangular or exponential.

A practical embodiment of a circuit arrangement as shown in FIG. 2 has been used for the operation of a high pressure discharge lamp as described in German Patent 3813412. The lamp had a nominal power consumption of 100 Watt and an electrode distance of only 1.4 mm. When a current pulse having a mean amplitude of 0.9 A was superimposed on the lamp current (having a mean amplitude of 1.1 A and an alternating frequency of 90 Hz) during the latter 8% of each half period, flickering could be substantially suppressed.

We claim:

1. Method for operating a high pressure discharge lamp comprising: supplying an alternating lamp current to the high pressure discharge lamp, generating a current pulse in a predetermined fraction of given half periods of the lamp current, said current pulse having the same polarity as the lamp current and being superimposed on the lamp current only in a latter part of the half period in which it is generated.

2. Method according to claim 1, which comprises generating said current pulse in each half period of the lamp current.

3. The method as claimed in claim 1 wherein said given half periods are less than all of the half periods occurring over a given time interval.

4. Circuit arrangement for operating a high pressure discharge lamp comprising:

input terminals (K1, K2) for connection to a supply voltage source, means, coupled to the input terminals, for supplying an alternating lamp current to the high pressure discharge lamp, and means for generating a current pulse in a predetermined fraction of the half periods of the lamp current, said current pulse having the same polarity as the lamp current and being superimposed on the lamp current in a latter part of the half period in which it is generated.

5. Circuit arrangement according to claim 4, wherein the current pulse generating means generate a current pulse in each half period of the lamp current.

6. Circuit arrangement as claimed in claim 4, wherein the means for supplying an alternating lamp current to the high pressure discharge lamp comprise means I coupled to said input terminals for generating a DC supply current from a supply voltage supplied by the supply voltage source, and a commutator for converting the DC supply current into the alternating lamp current.

7. Circuit arrangement as claimed in claim 6, wherein the means for generating a DC supply current comprise a DC-DC-converter having a switching element that is operated at a high frequency during lamp operation and the means for generating a current pulse comprise means for adjusting the duty cycle of the switching element.

8. Circuit arrangement as claimed in claim 6, wherein the means for generating a DC supply current comprise a DC-DC-converter having a switching element that is operated at a high frequency during lamp operation and the means for generating a current pulse comprise means for adjusting the switching frequency of the switching element.

9. Circuit arrangement as claimed in claim 4, wherein the frequency of the lamp current is selected from the range 50 Hz–500 Hz, the ratio between the mean amplitude of the current pulse and the mean amplitude of the lamp current is between 0.6 and 2 and the ratio between the duration of the current pulse and half a period of the lamp current is between 0.05 and 0.15.

10. Circuit arrangement as claimed in claim 4, wherein the amount of energy supplied to the high pressure discharge lamp by means of the current pulse is between 5% and 15% of the amount of energy supplied to the high pressure discharge lamp by the lamp current during one half period.

11. Circuit arrangement as claimed in claim 4, wherein the circuit arrangement comprises a power control loop including means for generating a signal that is a measure of a desired amount of power consumed by the high pressure discharge lamp and the means for generating a current pulse comprise means for adjusting said signal.

12. The circuit arrangement as claimed in claim 4 wherein the ratio between the duration of the current pulse and half a period of the lamp current is between 0.05 and 0.15 and the amount of energy supplied to the high pressure discharge lamp by means of the current pulse is between 5% and 15% of the amount of energy supplied thereto by the lamp current during one half period, and said current pulse is superimposed on the lamp current only in the latter part of the half period in which it is generated.

13. A circuit for operating a high pressure discharge lamp comprising:

input terminals for connection to a source of supply voltage, output terminals for connection to the high pressure discharge lamp, means including a switchable transistor coupled to said input terminals and to said output terminals for supplying an alternating lamp current to a high pressure discharge lamp when the lamp is connected to said output terminals, and means coupled to said lamp current supplying means for generating and supplying to the output terminals a current pulse in a given fraction of half periods of the lamp current, wherein said current pulse has the same polarity as the lamp current and is supplied to the output terminals only during a latter part of a half period of the lamp current.

14. The circuit as claimed in claim 13 wherein said means for supplying an alternating lamp current includes a transistor bridge coupled to said output terminals, the transistors of said bridge being alternately switched on and off at a switching frequency which is independent of a current supplied to the circuit from the supply voltage source.

15. The circuit as claimed in claim 13 further comprising means coupled to said switchable transistor and responsive to lamp current and lamp voltage for controlling operation of the switchable transistor so as to control the power consumed by a connected lamp.

16. The circuit as claimed in claim 15 wherein said controlling means comprise:

a circuit responsive to the lamp current and to the lamp voltage for deriving a first signal indicative of the power consumed in the discharge lamp means for deriving a reference signal indicative of a desired power to be consumed in the discharge lamp, and a comparator having first and second input terminals which receive said first signal and said reference signal, respectively, and an output terminal for supplying a control signal to a control electrode of the switchable transistor.

17. The circuit as claimed in claim 16 wherein said controlling means further comprises:

means for adjusting the level of said reference signal to a first value during a first part of a half period of the lamp current and to a second value in the latter part of a half period of the lamp current, whereby the comparator responds so as to adjust the duty cycle of the switchable transistor and thus the power consumed by a connected discharge lamp.

18. The circuit as claimed in claim 13 wherein the means for supplying an alternating lamp current include a converter circuit and the ratio between the mean amplitude of the current pulse and the mean amplitude of the lamp current is between 0.6 and 2.

19. The circuit as claimed in claim 13 wherein the means for supplying an alternating lamp current include a converter circuit and the ratio between the duration of the current pulse and half a period of the lamp current is between 0.05 and 0.15.

20. The circuit as claimed in claim 13 wherein the means for supplying an alternating lamp current include a converter circuit and the amount of energy supplied to the high pressure discharge lamp by means of the current pulse is between 5% and 15% of the amount of energy supplied thereto by the lamp current during one half period.

21. The circuit as claimed in claim 13 wherein said current pulse generating and supplying means produces periodic current pulses in non-successive half periods of the alternating lamp current.

22. The circuit as claimed in claim 13 wherein said current pulse generating and supplying means produces periodic current pulses in bursts of successive half period followed by successive half periods in which no current pulse is generated.

23. The circuit as claimed in claim 13 wherein said current pulse generating and supplying means produces the current pulses during the latter 8% of each half period of the alternating lamp current.

\* \* \* \* \*